United States Patent
Lindsay et al.

[11] Patent Number: 5,853,651
[45] Date of Patent: Dec. 29, 1998

[54] HIGH PRESSURE HOLLOW PROCESS FOR MANUFACTURING COMPOSITE STRUCTURES

[75] Inventors: Howard A. Lindsay, Cordova, Tenn.; Jeffrey A. Mears; Robert F. Monks, both of Chandler, Ariz.; Steven M. Motoyama; Christopher K. DeLap, both of Phoenix, Ariz.

[73] Assignee: Simula, Inc., Phoenix, Ariz.

[21] Appl. No.: 711,181

[22] Filed: Aug. 28, 1996

Related U.S. Application Data

[60] Provisional application No. 60/003,379 Sep. 7, 1995.

[51] Int. Cl.$^6$ .............................. B29C 44/06; B28B 7/30
[52] U.S. Cl. ................. 264/512; 264/516; 264/314; 264/317; 264/221; 264/250; 264/257; 264/258; 264/DIG. 44
[58] Field of Search ..................... 264/314, 317, 264/257, 258, 516, DIG. 44, 512, 221, 250

[56] References Cited

U.S. PATENT DOCUMENTS

| | | | |
|---|---|---|---|
| Re. 24,617 | 3/1959 | Greene | 264/317 |
| 736,229 | 8/1903 | Davis | 264/516 |
| 910,370 | 1/1909 | Gleason | 264/317 |
| 935,254 | 2/1909 | Gleason | 264/314 |
| 1,349,372 | 8/1920 | Egan | 264/317 |
| 1,504,547 | 8/1924 | Egerton | 264/317 |
| 2,345,977 | 4/1944 | Howard et al. | 264/317 |
| 2,739,350 | 3/1956 | Lampman | 264/221 |
| 2,744,043 | 5/1956 | Ramberg | 264/DIG. 44 |
| 2,995,781 | 8/1961 | Sipler | 18/56 |
| 2,999,780 | 9/1961 | Perrault | 154/83 |
| 3,270,111 | 8/1966 | Haldemann | 264/516 |
| 3,518,338 | 6/1970 | Tambussi | 264/317 |
| 4,144,632 | 3/1979 | Stroupe | 264/314 |
| 4,165,071 | 8/1979 | Frolow | 264/221 |
| 4,169,749 | 10/1979 | Clark | 264/314 |
| 4,211,592 | 7/1980 | Grawey | 264/317 |
| 4,343,757 | 8/1982 | Popplewell | 24/DIG. 44 |
| 4,446,092 | 5/1984 | Bliley | 264/314 |
| 4,575,447 | 3/1986 | Hariguchi | 264/516 |
| 4,889,355 | 12/1989 | Trimble | 264/314 |
| 4,900,048 | 2/1990 | Derujinsky . | |
| 4,941,673 | 7/1990 | Trimble | 264/258 |
| 4,982,975 | 1/1991 | Trimble | 264/258 |
| 4,986,949 | 1/1991 | Trimble | 264/258 |
| 5,080,048 | 1/1992 | Duplessis . | |
| 5,158,733 | 10/1992 | Trimble . | |
| 5,176,864 | 1/1993 | Bates et al. | 264/221 |
| 5,207,964 | 5/1993 | Mauro | 264/221 |
| 5,242,517 | 9/1993 | Endoh | 264/314 |
| 5,310,516 | 5/1994 | Shen | 264/512 |
| 5,318,819 | 6/1994 | Pai . | |
| 5,460,675 | 10/1995 | Moser | 264/314 |
| 5,560,883 | 10/1996 | Lane et al. | 264/317 |
| 5,614,143 | 3/1997 | Hagar | 264/317 |
| 5,624,519 | 4/1997 | Nelson et al. | 26/314 |

*Primary Examiner*—Jan H. Silbaugh
*Assistant Examiner*—Robin S. Gray
*Attorney, Agent, or Firm*—Crowell & Moring LLP

[57] ABSTRACT

A method of fabricating complex hollow composite structures from laminates of fiber reinforced synthetic resins. The structures are fully monocoque tubes with no seams. The tubes are manufactured by wrapping a hollow semi-rigid inner mandrel made of thermoplastic material such as polystyrene or ABS (acrylonitrile-butadiene-styrene co-polymer) with layers of composite sheets. The sheets are made from high-strength fibers impregnated with thermosetting or thermoplastic resins.

The laminated mandrel is placed in a mold, heated and inflated to a predetermined pressure. The pressure can range from 20–200 psig and even higher, while the curing temperature can range from 200°–600° F. The pressure generated by the expanding core produces a highly consolidated composite structure that has fewer voids, a more uniform thickness, and an increased fiber content compared to hollow composites made by other fabrication methods.

21 Claims, 11 Drawing Sheets

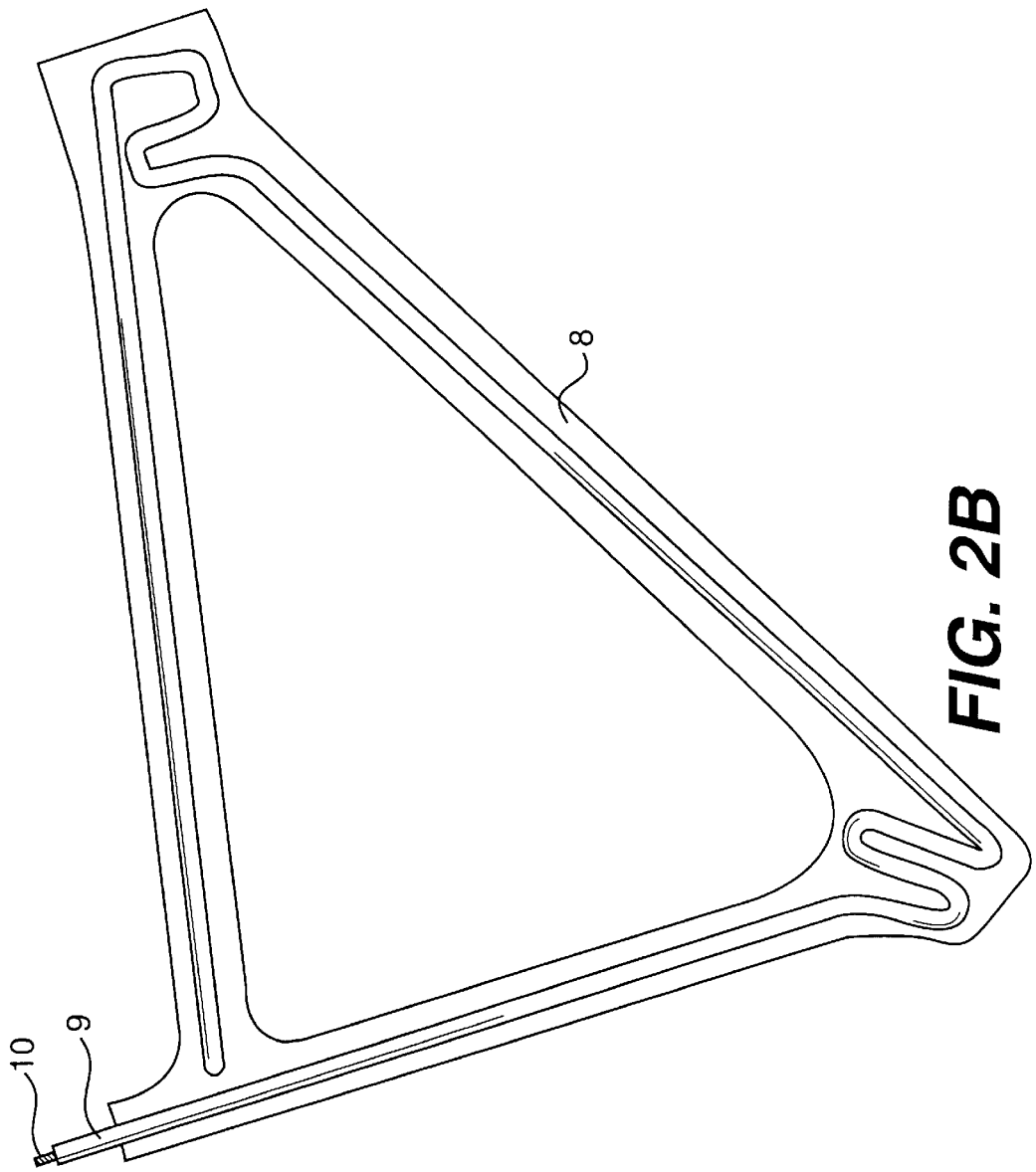

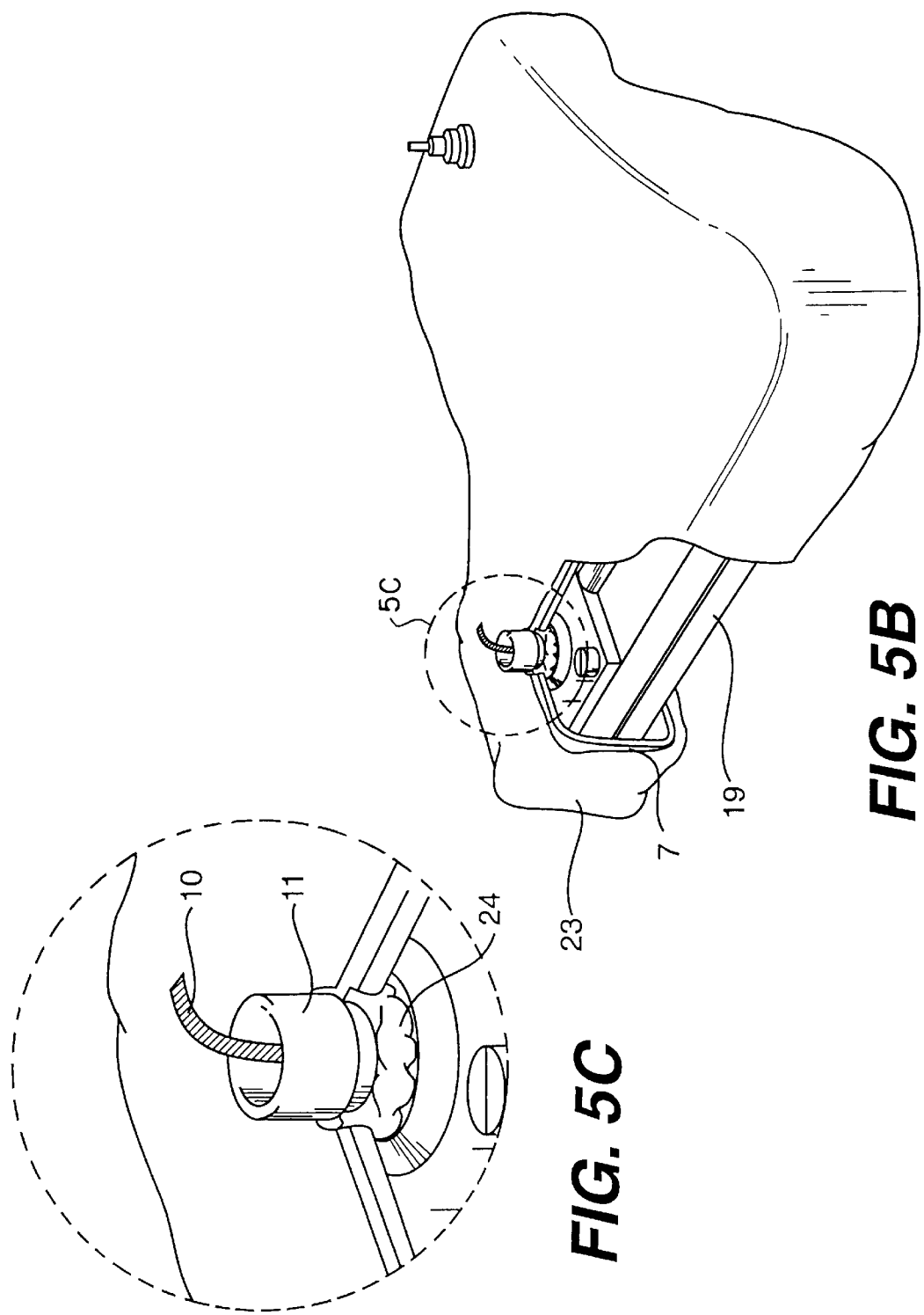

HIGH PRESSURE HOLLOW PROCESS FOR MANUFACTURING COMPOSITE STRUCTURES

The present application claims the benefit of the filing date U.S. Provisional Application Ser. No. 60/003,379, filed Sep. 7, 1995.

BACKGROUND OF THE INVENTION

1. Field of the Invention

The present invention relates to the manufacture of high strength, light weight parts made of composite materials. In particular, the present invention is a method for fabricating complex hollow composite structures from laminates of fiber reinforced synthetic resins.

2. Background

Bicycle frames and other hollow core structures have been traditionally been made from tubes of iron or steel brazed or welded together. More recently materials such as aluminum or titanium have been used to reduce weight. The use of composite structures of fiber reinforced resins have further reduced weight while maintaining high strength. Rather than utilizing welding or brazing for connecting tubing, composite structures can be made from layers of fiber material impregnated with thermosetting or thermoplastic resins. These sheets of impregnated fibers are called "prepregs" and are usually cured under heat and pressure in a mold to define the shape.

One of the problems with tubular structures, such as bicycle frames, is that stresses are highest at the tubing junctions. Thus the bicycle tubing should be thicker near the junctions for strength, and thinner in the long straight sections.

Some methods have utilized previously-cured tubing and used various methods for joining the tubes together by cementing, foam filling, or wrapping with prepreg and a second cure. For example, Derujinsky in U.S. Pat. No. 4,900,048 produces tubes by wrapping fabric on a tube mandrel, painting it with a resin, and applying pressure to it by wrapping with a peel ply tape. This results in low and uneven pressure which tends to leave voids and resin rich areas. It also gives a low content of reinforcing fiber.

The tubes are then cut and joined by wrapping the joints with fabric, painting them with resin, and using a peel ply tape wrapping to force the painted-on resin through the fabric. This is followed by a second cure. A second or separate cure cycle creates residual cure stresses at the interface of the different materials due to cure shrinkage. Also the load path is not direct from one tube member to the other because they have a joint. Thus it is not a true one piece seamless monocoque tubular structure.

Pai in U.S. Pat. No. 5,318,819 also uses pre-cured tubes with lugs at the joints. Tube and lug structures are intrinsically weaker than a seamless monocoque structure. Bags of expanding foaming adhesive are used for compacting the material wrapped over the pre-cured tubes. This second cure creates residual stresses at the interface due to cure shrinkage. Additionally the foam cannot be nearly as strong as the fiber reinforced material.

Duplessis in U.S. Pat. No. 5,080,385 uses inflatable bladders for compaction of prepreg material. Separate metal parts are also incorporated in the structure. However, the use of separate structural components that are joined together compromises the strength of the structure. Overlapping tabs are cut in the preformed tubes to form connections which can lead to undesirable wrinkles. Also, since the bladders do not provide proper compaction in the metal inserts, an expandable epoxy foam is used to fill sharp acute angles and voids in the metal pieces.

Trimble in U.S. Pat. No. 5,158,733 uses prepreg material of fiber reinforced heat curable resin laid up in female mold cavities. A bladder is used inside the mold to compact the prepreg from the inside, while the prepreg is held from the outside by the two halves of the mold. This technique allows only a single shear area to join and transfer all of the loads and stresses from one side of the frame to the other. The seam between the frame halves is created by extending the laminate on one side out past the mold surface and folding it over the expanding bladder. Upon pressurization, the bladder forces the folded laminate over against the opposite side creating a seam, which joins the two laminates at a single layer shear interface. This seam can fail under stress. A further problem is that the overlapped material may not be compressed properly by the bladder.

The use of inflatable bladders to supply compaction pressure often results in wrinkles caused by uneven pressure distribution. This further results in resin rich areas and high void regions. The laminate design must allow for these weak regions by adding more material and therefore weight. Also bridging may occur if the prepreg ply does not lay down properly in interior corners, and leaves voids in the laminate. In addition, the bladders must often be left inside the finished part, whenever a complex tubular path prevents mechanical extraction of the bladders.

Accordingly, forming thicker sections near junctions has not been practical in prior art. In some case, foam or resin filling has to be inserted in finished parts to increase the strength at junctions. This can result in bicycle frame failure under high stress conditions. Also, in female mold layups, it is difficult to work the layers of ply into position, because they must be pressed in with a rod or tool. This results in a high bulk factor. (The bulk factor is the ratio of the uncured thickness to the cured thickness. A lower bulk factor results in a stronger finished piece.) With a large bulk factor, the fibers at the outer surface may become wrinkled during compaction. The result is a reduction in the outer fibers' ability to carry the high loads and stress that are present under normal use.

SUMMARY OF THE INVENTION

The present invention is a method for fabricating hollow composite structures using a dimensional inner mandrel that expands during cure to provide laminate consolidation. After the curing process is complete, the inner mandrel is removed from inside of the laminate by solvent extraction.

The process starts with a hollow semi-rigid inner mandrel made of thermoplastic material such as polystyrene or ABS (acrylonitrile-butadiene-styrene co-polymer). Inside the thermoplastic mandrel is an elastomeric tube that is pressurized during cure. The thermoplastic mandrel is wrapped with plies of composite prepreg material. A prepreg of thermosetting or thermoplastic resin with high strength fiber reinforcement is used. Wrapping the mandrel is a quick and easy process. The mandrel is a semi-rigid structure and the tack of the prepreg conveniently holds the plies in place during lamination. Wrapping the prepreg on a male mandrel allows for accurate ply placement and control of laminate thickness. Fiber orientations are made at 0°, ±30°, ±45°, ±60°, and 90° overlaps to maximize strength at high stress points.

The mandrel, laminated with prepreg, is then placed in a mold and heated. The mandrel is inflated to the desired pressure. The consolidation pressure can range from 20–200 psi and even higher, while the curing temperature can range from 200°–600° F. (All pressures listed herein are relative to atmospheric pressure.) The pressure generated by the expanding core produces a highly consolidated composite structure that has fewer voids, a more uniform thickness, and an increased fiber content compared to hollow composites made by other fabrication methods. When an autoclave is used for curing, in which the pressure is exerted both on the external mold surface and the interior of the mandrel at the same time, soft tooling and high pressure may be used because of the absence of a differential pressure across the mold. These factors make a much stronger structure. The process is particularly useful for, but not limited to, fabricating high strength, lightweight structures such as bicycle frames.

The bulk factor of the material is minimized because the prepreg is pressed against the exterior surface of the semi-rigid mandrel, eliminating entrapped air and ply wrinkles.

The present invention allows for additional shapes to be molded into the interior of the hollow structure, with excellent dimensional control. This is accomplished by forming a mandrel to the desired section, prior to wrapping the mandrel with plies of the composite material.

The present invention is described herein in terms of fabricating bicycle frames. However, the present invention can be used in a wide variety of applications, and is not limited to bicycle frames. For example, as described in greater detail below, the present invention can be used for aerospace/aircraft applications such as for ducts, small wing structures, flaps, fins, and fuel cells; for model aircraft applications such as for frames or fuselages, fuel tanks, and wings; for motorcycle applications such as for handlebars, forks, swing arms, frames, fuel tanks, and seat structures; for automobile applications such as gas tanks or fuel cells, structural fluid containers, and electric car bodies and frames; for snowmobile applications such as for frames, bars, struts, and gas tanks; for watercraft, such as surfboards, bodyboards, kayaks, wind surfboards, and masts; for wheelchairs; for tractors and other utility vehicles; and for sporting goods such as tennis racquet or golf clubs.

Accordingly, it is an object of this invention to produce hollow composite structures that are true one piece seamless monocoque structures.

Another object of this invention is to produce hollow composite structures with less voids and higher fiber content for increased strength and more uniform thickness.

Another object of this invention is to use a semi-rigid mandrel to eliminate wrinkles, which often occur when pressurized air bags are used, and which cause resin-rich areas and voids in the composite structure.

Another object of this invention is to use a semi-rigid male mandrel to facilitate the lamination and layup of the prepreg thus minimizing the material bulk factor.

Another object of the present invention is to use a semi-rigid male mandrel that can incorporate dimensionally accurate, repeatable internal reinforcements on the inside surface of complex hollow structures. The reinforcements include, but are not limited to, hat stiffeners, bead stiffeners, blade stiffeners, ribs, and networks of ribs.

Another object of the invention is to consolidate prepreg laminates under high pressure which reduces void content, and improves the strength of the composite.

Another object of this invention is to make complex hollow composite structures with closely controlled external and internal dimensions.

Another object of this invention is to provide a means for removing the mandrel after cure in order to reduce weight.

Another object of the invention is to provide a method that uses soft tooling, yet allows for the use of high compaction pressures and autoclave curing.

Another object of the invention is the use of an internal mandrel which lends itself to several methods of pressurization during cure.

Another object of the invention is the use of a single cure cycle to produce complete homogeneity of material throughout the structure.

DESCRIPTION OF THE DRAWINGS

FIG. 2B is a schematic diagram of the placement of the elastomeric bladder within the semi-rigid mandrel.

FIG. 5B is a schematic diagram of the curing mold assembly in its vacuum bag.

FIG. 5C is a schematic diagram of the present invention.

DETAILED DESCRIPTION OF THE INVENTION

The present invention will be described with reference to FIGS. 1–7.

Figure 1A:
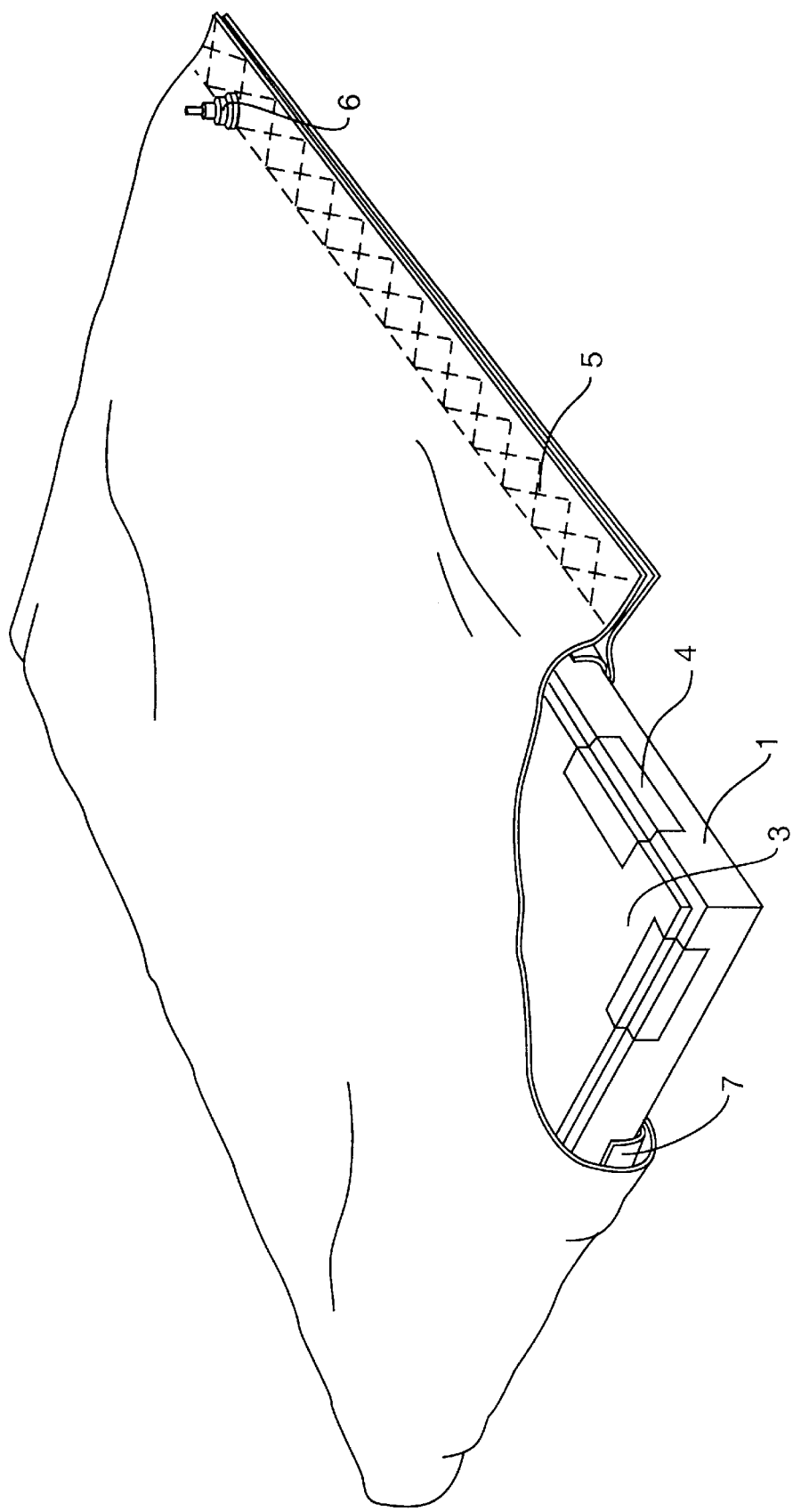
FIG. 1A is a schematic diagram of the mandrel thermal forming tool with thermoplastic sheet.
Figure 1B:
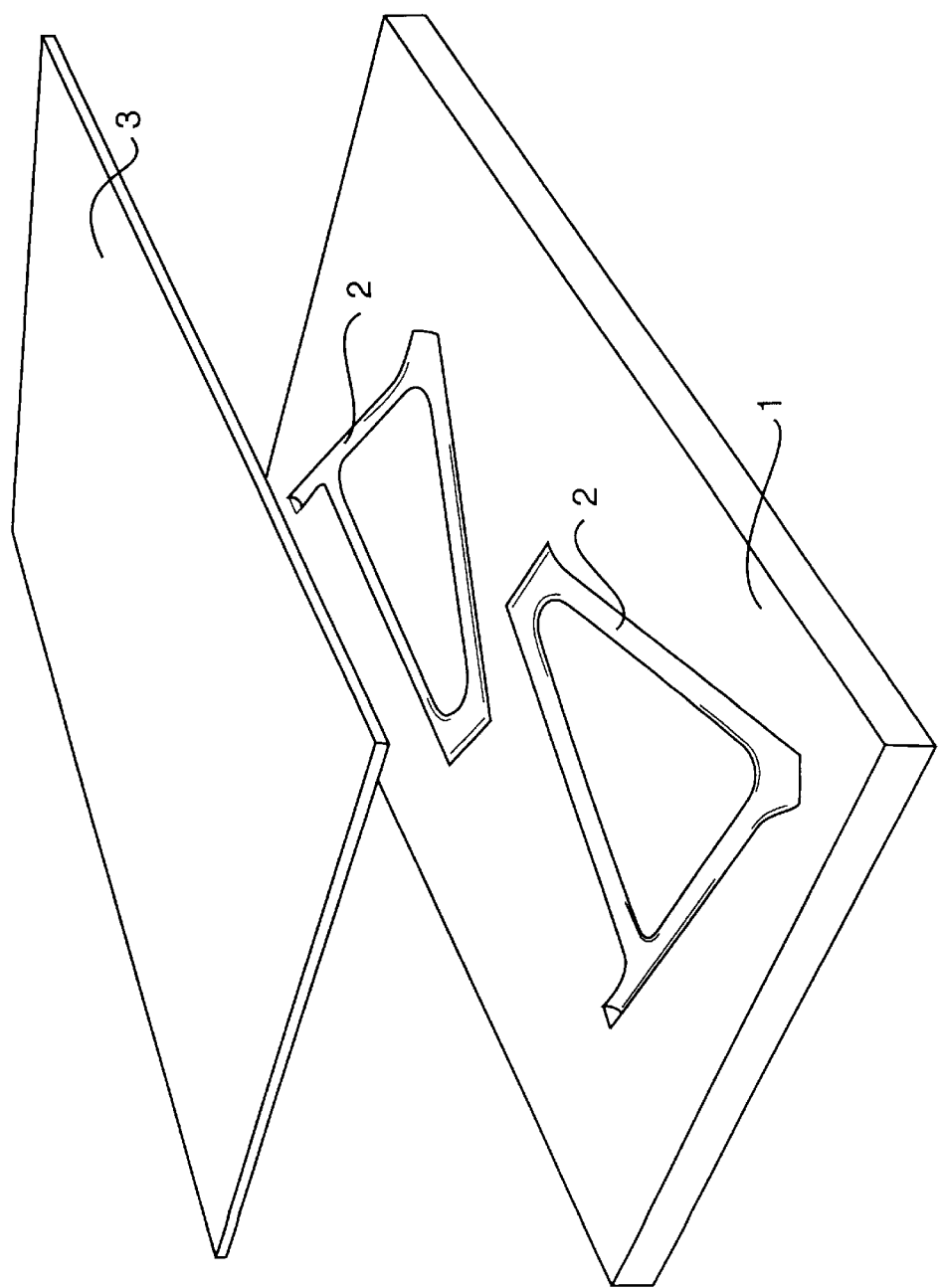
FIG. 1B is a schematic diagram of the thermal forming tool with thermoplastic sheet taped in place, assembled in the vacuum envelope bag.

A preferred method for fabricating the expandable, semi-rigid mandrel is by vacuum forming the mandrel in a mold. Molds can be fabricated, e.g., by machining wood such as mahogany to form the desired pattern. As shown in FIG. 1, mold 1 is used to form an expandable core. A sheet of 1/16 inch thick polystyrene 3, larger than the mold cavities 2, is placed on top of the mold, fully covering the cavity. The sheet is taped at the edges with high temperature tape to prevent movement during processing. The tape is shown as 4 in FIG. 1A. The mold is placed in an envelope vacuum bag 5 made of high elongation elastomer, preferably silicone with a minimum elongation of 400 percent.

The silicone vacuum bag, with vacuum connection 6, containing the mold is placed in an oven. The oven is heated to 275°–300° F. When the polystyrene sheet reaches 265°–285° F., as measured by thermocouples in direct contact with the polystyrene sheet, vacuum is applied to the silicone vacuum bag, and the polystyrene sheet is forced into the mold cavities, forming one half of a mandrel. The formed half of the mandrel is held at temperature, under vacuum, for a maximum of 5 minutes. The mold is removed from the oven and the formed mandrel half is allowed to cool below 200° F. prior to removal from the mold.

Figure 2A:
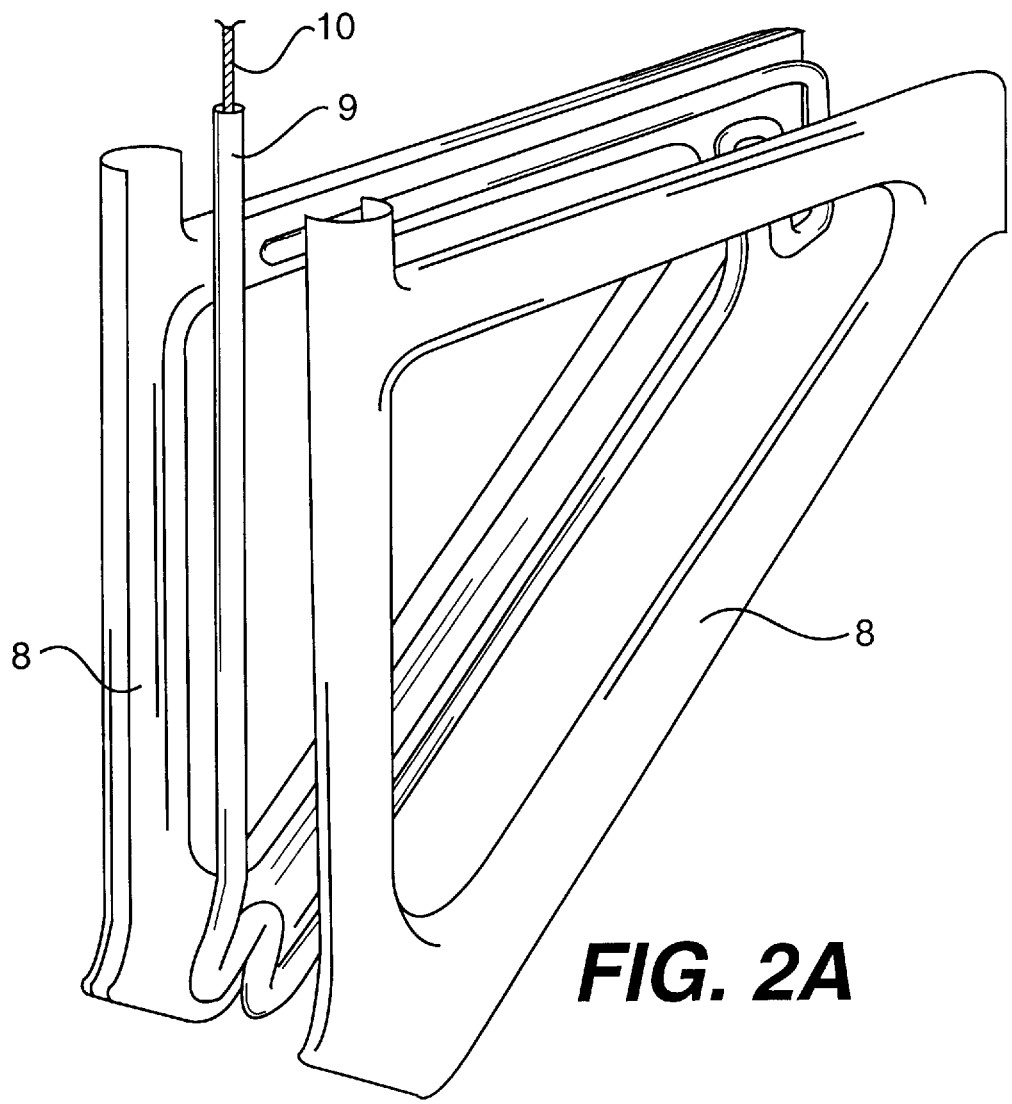
FIG. 2A is a schematic diagram of two semi-rigid mandrel halves with elastomeric bladder.

An elastomeric bladder is then placed inside a trimmed mandrel half, and a second mandrel half is taped to the first mandrel half, as shown in FIGS. 2A and 2B. The elastomeric bladder may be made of silicone or nylon films, or EPDM (ethylene-propylene terpolymer) rubber (which is the preferred material). The bladder is made by thermally sealing two flat layers of the bladder material to each other at their edges, using heat and pressure. The bladder is knotted at one end and inverted on itself to position the knot inside the tubing. This placement of the bladder in the mandrel prevents overexpansion and possible failure during pressurization.

Figure 2C:
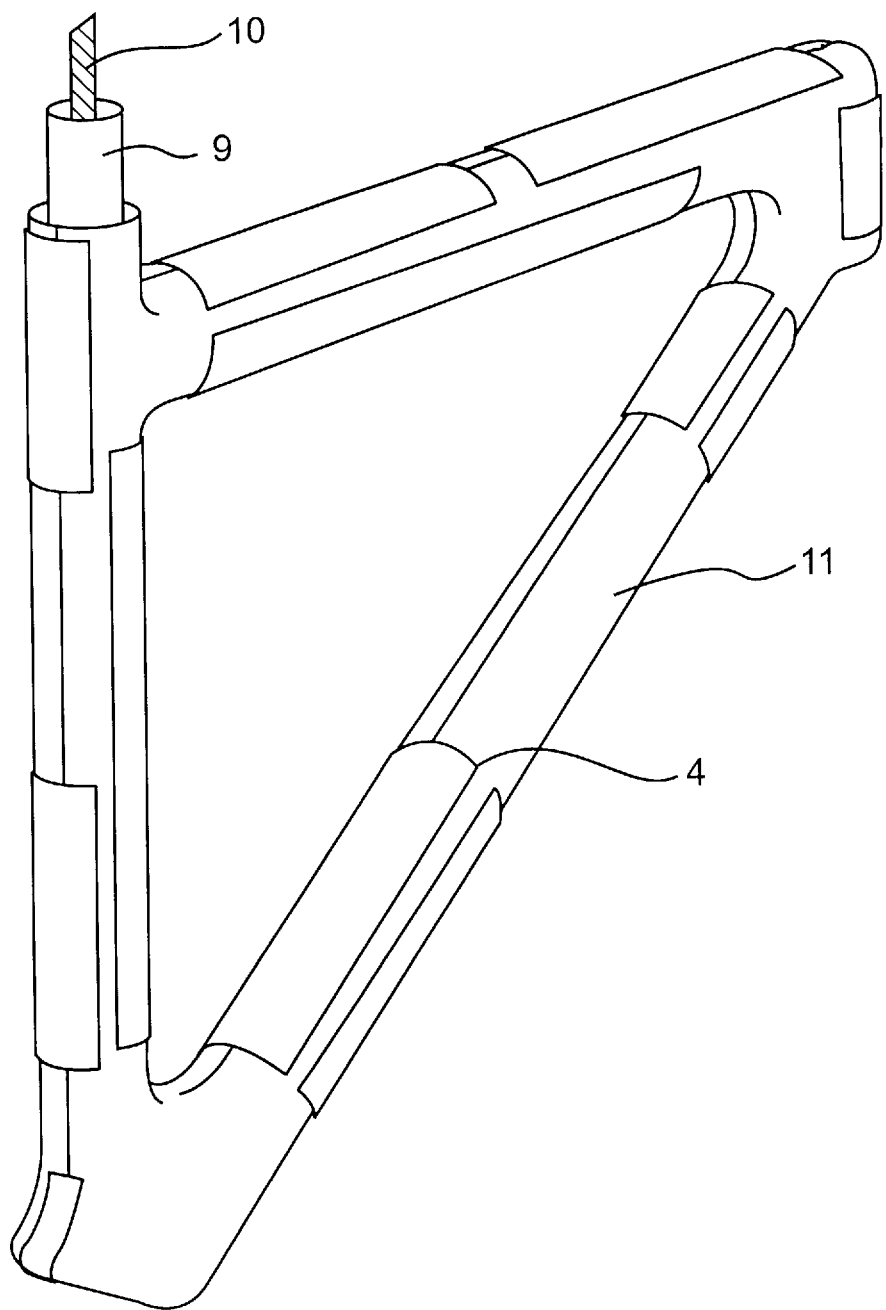
FIG. 2C is a schematic diagram of the assembled semi-rigid mandrel prepared for prepreg ply layup.

FIG. 2B shows the proper placement of the bladder with a breather strip 10 placed inside the bladder to ensure a path for pressurization over the full length of the bladder. The semi-rigid mandrel, containing the elastomeric tubing, is taped together using Nylon tape 4 around the full perimeter as shown in FIG. 2C.

The assembled semi-rigid laminating mandrel is used for laying up sheets or tapes of the preferred prepreg material, which is standard 33 Msi modulus graphite fiber with epoxy resin. The preferred epoxy resin is a modified 250° F. curing system. The modifiers provide increased toughness and abrasion resistance. Other reinforcing fibers such as fiberglass, aramid, and boron may also be used. Thermoplastic as well as thermosetting resins may also be used. The semi-rigid mandrel facilitates the laying up process. The tack of the prepreg material allows for very accurate ply placement with no chance of movement as the male mandrel is loaded into the curing mold.

Multiple layers of prepreg overlaid at 0, ±45°, ±60° or 90° fiber orientation can be readily applied at junctions, for example, for local increases in strength and stiffness. Any orientation can be used depending upon the end use of the composite structure.

Different reinforcement fibers may be used in different layers on the same composite. In the preferred method, a combination of graphite, fiberglass, and aramid fibers are used depending upon the end use of the laminate. The preferred wall thickness for using the tubular composite in a bicycle frame is 0.100–0.125 inch in highly stressed areas, and 0.040–0.060 inch in low stress areas. Other thicknesses may be used in other structures.

Figure 3:
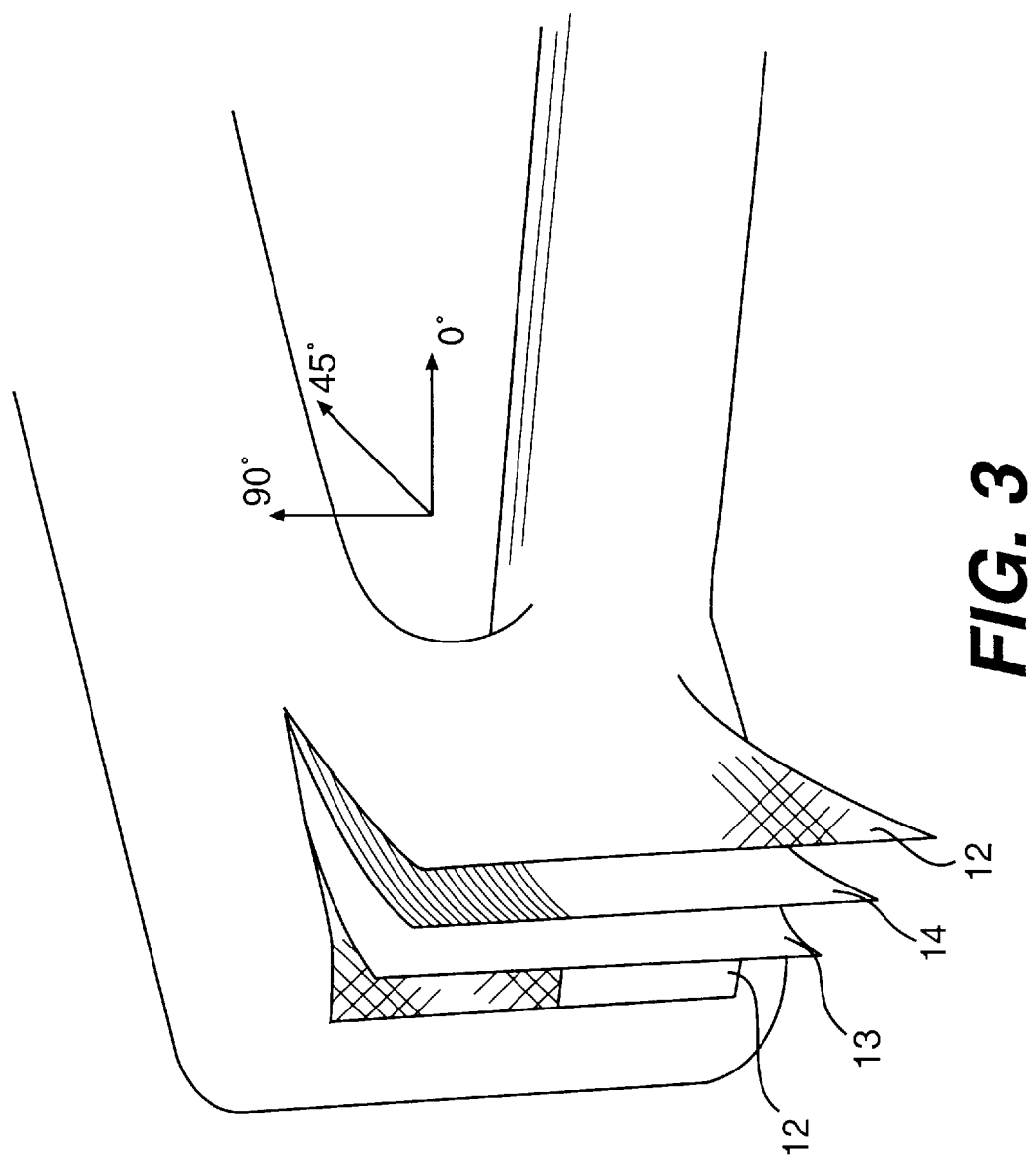
FIG. 3 is a schematic diagram illustrating a method of orienting fiber directions during layup for increased strength in high stress areas.
Figure 4:
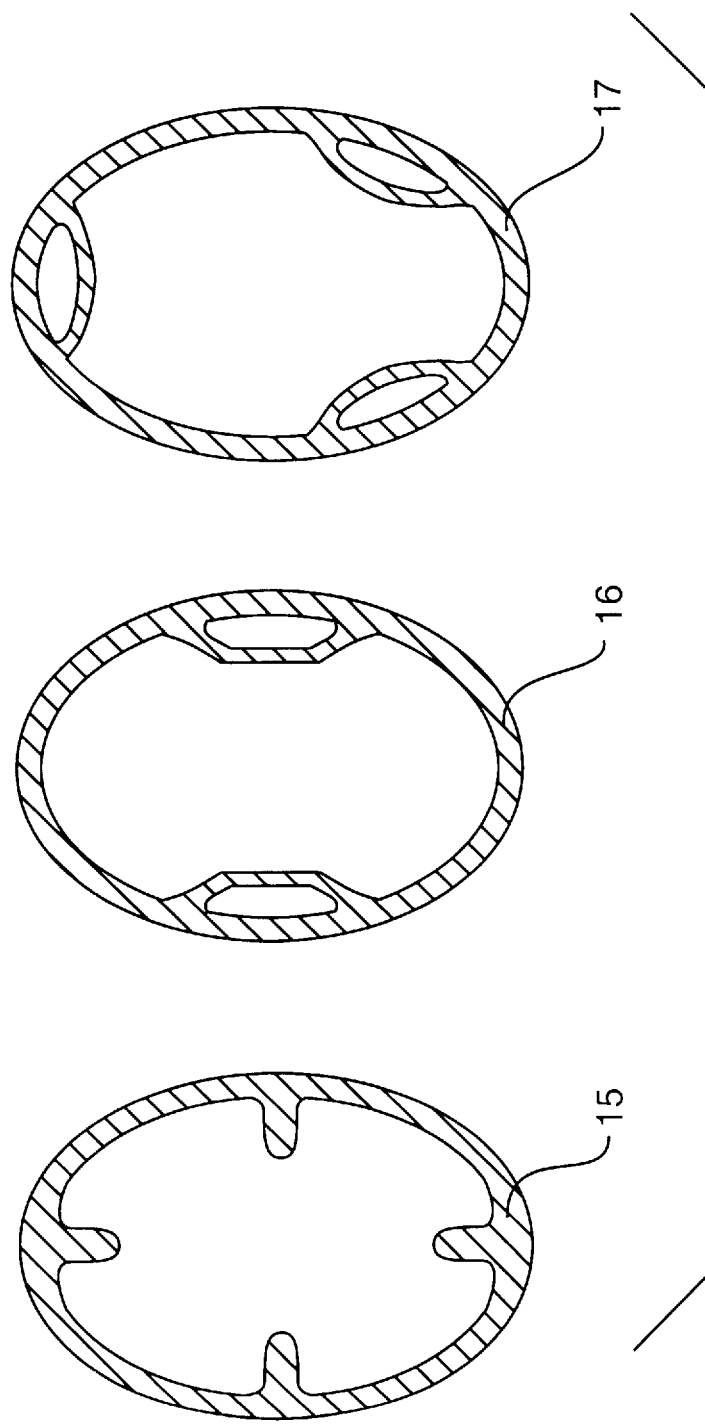
FIG. 4 is a schematic diagram of examples of tube cross sections and internal reinforcing structures.

FIG. 3 shows a ±45° orientation of laminate prepreg 12 with plain weave fabric, prepreg 13 with a 90° orientation, and prepreg 14 with a 0° orientation. FIG. 4 shows possible reinforcing structures that can be molded with proper mandrel geometries where 15 is a rib reinforced tube cross-section; 16 a hat stiffener reinforced tube cross-section; and 17 is a bead stiffener reinforced tube cross-section.

Figure 5A:
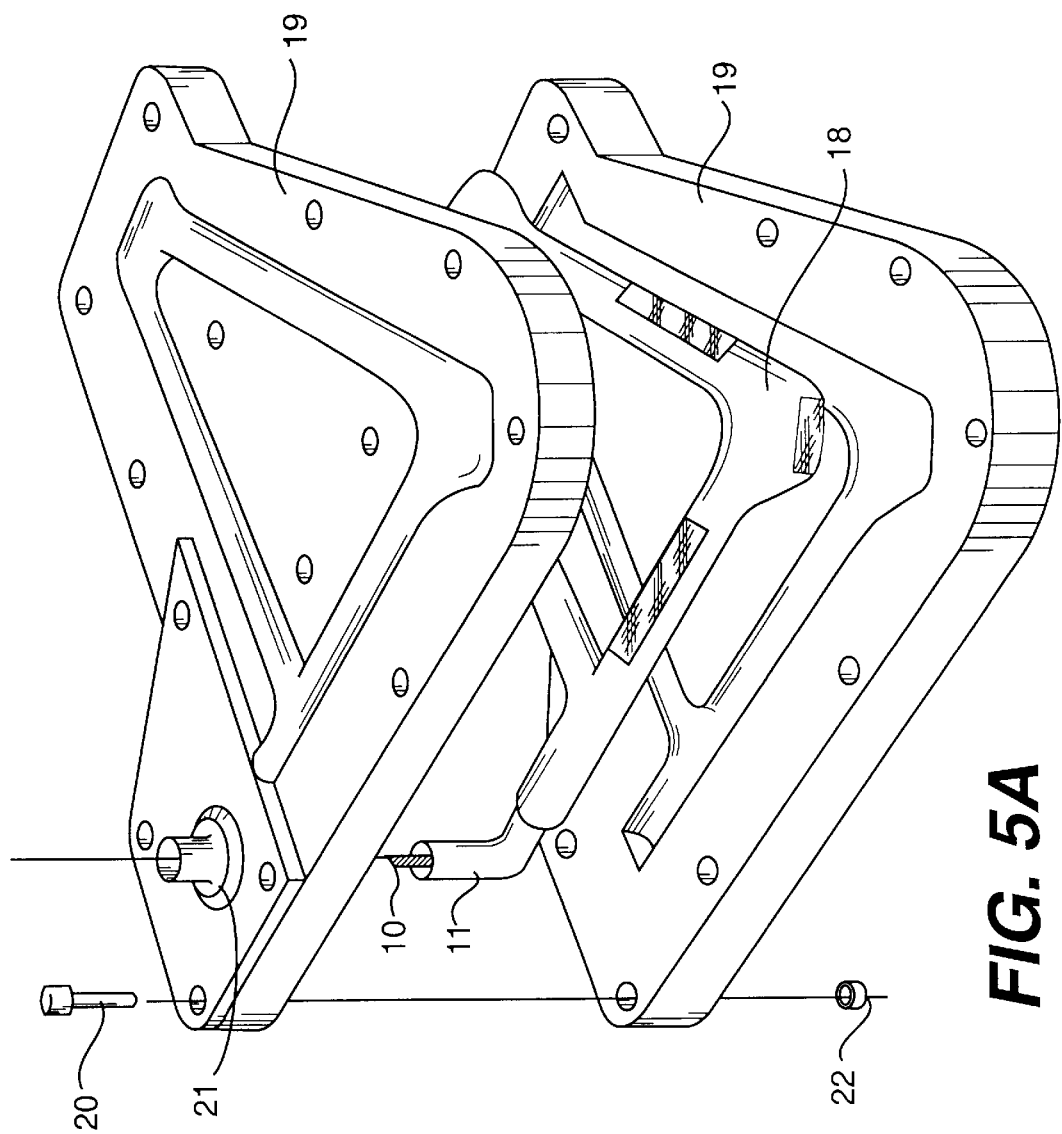
FIG. 5A is a schematic diagram of a mandrel with applied laminations and curing mold halves.

FIG. 5A shows a mandrel 18 with uncured laminate, curing mold 19, and vacuum-pressure port 21. The uncured laminate and mandrel are placed in a curing mold half. The other half of the split mold is aligned and bolted in place. The mold is placed into an envelope vacuum bag that is sealed around the base of the pressure nipple (as shown in detail in FIG. 5B), and the full perimeter of the vacuum bag. A vacuum source and monitor fitting are attached and connected to the corresponding autoclave fittings. Thermocouples are attached to the vacuum bag over the tool and to the readout instruments on the autoclave. Vacuum is applied, which is nominally 25–29 inches of mercury. Thermocouples are then checked for proper operation.

After the autoclave is closed, it is pressurized to at least 20 psi (typically 100 psi), at a rate of 5–10 psi per minute. The thermal cycle starts with a ramp rate of 3°–5° F. per minute and the pressure is maintained at 100 psi. At a predetermined temperature of at least 125° F. (typically, 150°±10° F.), the temperature is held for at least 5–10 minutes (typically, about 60 minutes). The temperature is then ramped at, e.g., 20 per minute to at least 200° F. (typically, 250° F.) and the part is held at that temperature for 90 minutes. The part is cooled to below 150° F. at a maximum rate of 5°–7° F. per minute.

Figure 7:
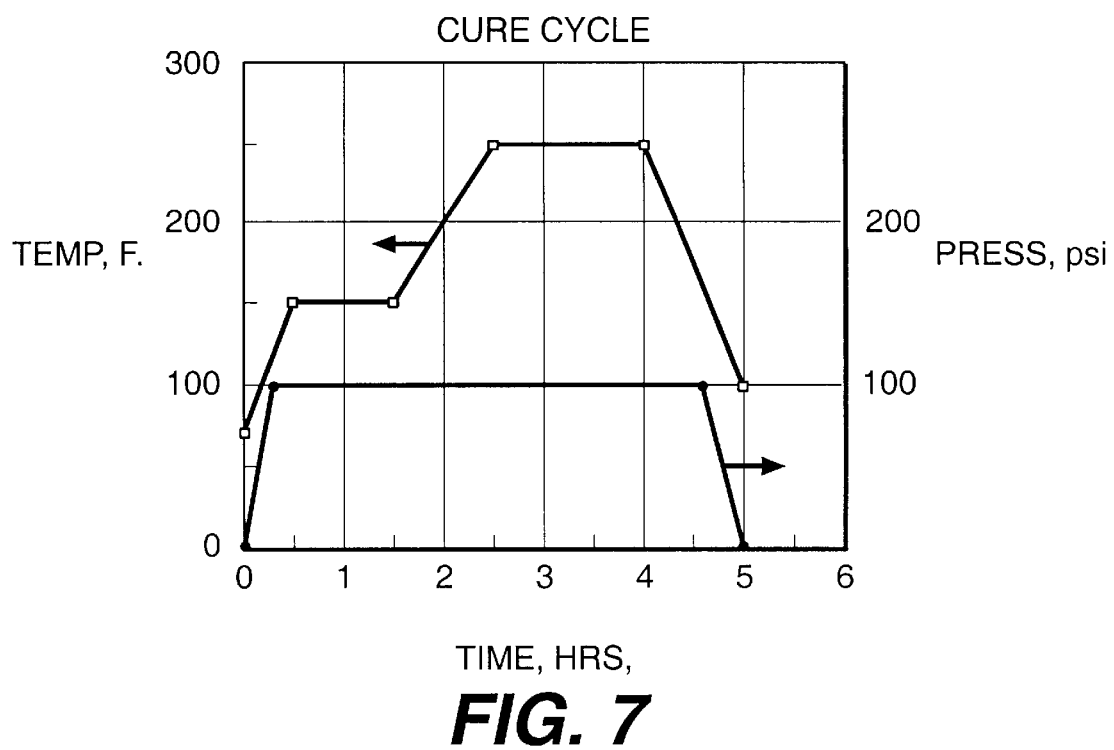
FIG. 7 is a schematic diagram of a typical curing cycle.

FIG. 7 illustrates two exemplar curing cycles. The lower plots in FIG. 7 illustrate the pressure cycles (right-hand axis), and the upper plot illustrates the temperature cycle (left-hand axis). In the first example, the pressure is raised from atmospheric pressure to 100 psi at about 6–7 psi per minute over about 15 minutes, the pressure is maintained at 100 psi for an additional 4 hours and 15 minutes, and the pressure is allowed to ramp back down to atmospheric pressure at about 3–4 psi per minute over 30 minutes. The temperature is raised from ambient temperature to the curing temperature, 250° F. in this case, at a rate of 1.5° to 5° F. per minute It is maintained at 250° F. for an additional 90 minutes, and is then reduced to 100° F. over an additional 60 minutes, at a rate of 1.5°–2° F. per minute.

In the second example, the sample is subjected to an additional pressure step prior to the main curing step. As shown by the lower pressure plot in FIG. 7, the pressure is ramped at 3–5 psi/minute from atmospheric pressure to 25 psi. The pressure is held at 25 psi for 10 to 15 minutes, and then ramped up to 100 psi at 3–5 psi/minute. It is then held at 100 psi for 2.5 to 4.5 hours (in the case shown in FIG. 7 for about 3 hours and 15 minutes). The temperature cycle consists of heating the sample to about 150° F. over about 30 minutes, holding the sample at about 150° F. for about one hour, then heating the sample to about 250° F. over about one hour, then holding the sample at about 250° F. for about 90 minutes, and then allowing the sample to cool below 150° F. over about one hour, at a maximum cooling rate of 5° to 7° F. per minute. Once the temperature is below 150° F., the pressure is reduced to atmospheric pressure over about 30 minutes.

Figure 6:
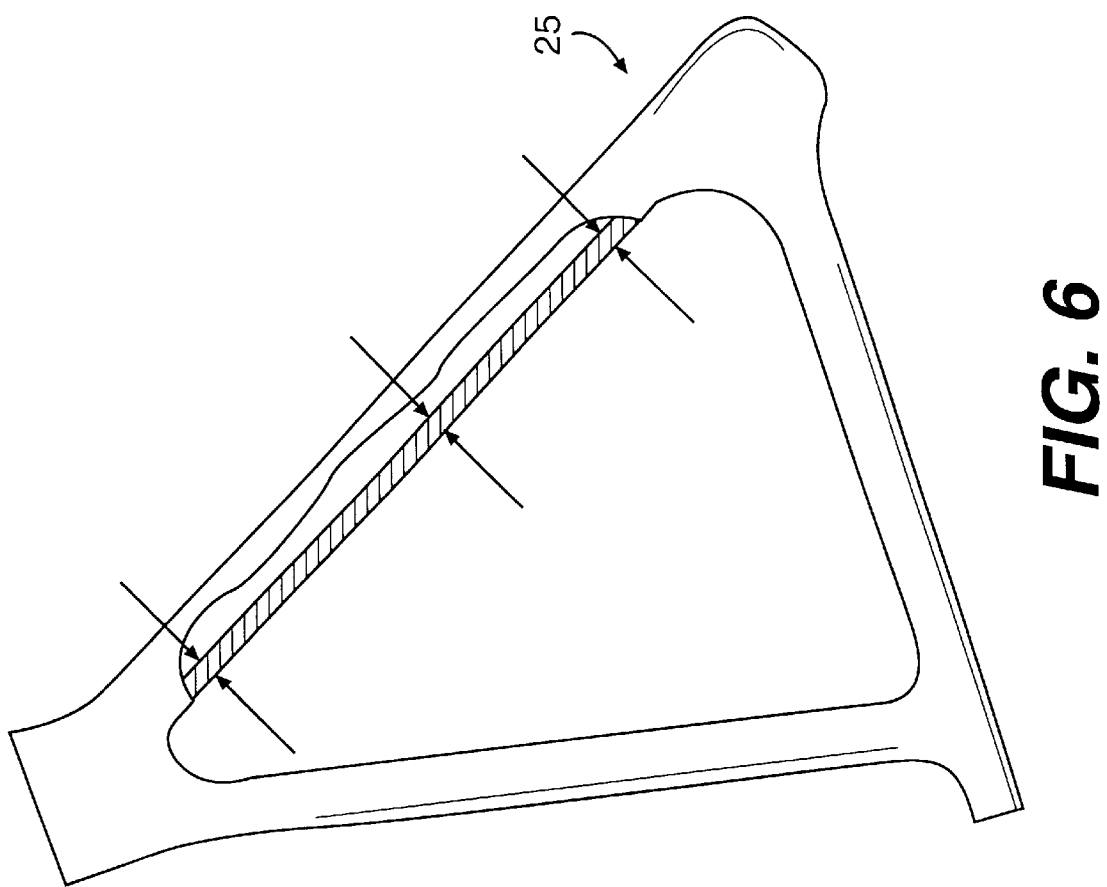
FIG. 6 is a schematic diagram showing how the wall thickness of the composite can be varied, to reduce the overall weight of the structure while maintaining its structural strength near junctions.

After the assembly is cured, it is removed from the autoclave and the composite structure is removed from the curing mold. The mandrel is then removed by solvent extraction, leaving no bag or bladder to snag control cables inside the bicycle frame. The solvent used is methyl-ethyl-ketone (MEK). The composite part can then be machined for metal fittings, finish sanded, and painted. FIG. 6 shows a cross-section of a cured part 25 illustrating the thickness variation for weight reduction.

An autoclave method for curing is preferred because soft tooling may be used with autoclave curing. Because there is minimal differential pressure across the mold, expensive hard metal molds are not required. Additionally, complex pressure connections do not need to be made to the mold, or to an enclosed pressurization bag. It also allows higher pressures to be used, e.g., 100–200 psi and even higher, which consolidates the laminate better than previous methods. Thus the present invention produces a fully monocoque, seamless structure which is strong and lightweight.

Although the preferred method of pressurization is to cure the assembly in an autoclave, methods using pressurized gas, pressurized liquids, or heat-expandable foams, paste, or beads may be used.

Additional Examples of Applications for the High Pressure Hollow Process

In addition to bicycles, many other structures have the bicycle's structural requirements of high strength, high rigidity, and light weight. For example, motorcycle frames, on a larger scale, share the bicycle's requirement for strong lightweight components, and thus would constitute a good application of the present invention. Placing strengthening material at the frame intersections without the usual limitations of seams and bonded joints allows large composite frames to be efficiently produced using the present invention. Channels could be incorporated into the resultant hollow frame to separate wiring from hot engine components and to ease installation. Strong lightweight composite frames would be especially desirable to drag racers, endurance racers and high performance sport bike enthusiasts. Similarly, frames for snowmobiles, tractors, buggies, aircraft and other vehicles could also be produced by the present invention, as well as bars and structural members such as handlebars, forks, swing arms and roll cages.

The present invention could also be used to manufacture a lightweight wheelchair chassis. The weight of a wheelchair is an important factor in its design and function since lightweight wheelchairs reduce fatigue when human-powered and consume less energy when electric-powered. Wheelchairs composed of lightweight composite materials are also more maneuverable and allow greater portability. The process used to make a wheelchair chassis would be similar to the bicycle frame except that the wheelchair frame would be created as two components connected by folding bars.

Other sporting goods besides bicycles can be produced using the present invention, including tennis, badminton and racquetball racquets. A flexible, semi-rigid mandrel would be formed in a general racquet shape, with the final form of the product being determined by the particular mold used. While other composite molding processes require the mandrel to remain in the finished product, the present invention allows the mandrel to be removed after the heating and curing process, producing a higher quality composite racquet.

The present invention could also be used to strengthen lightweight golf clubs. The two main parts of the golf club, the head and the shaft, are currently produced separately and then fastened or bonded together. While many golf club shafts are carbon fiber composite, golf club heads are still generally metallic. The present invention would allow a composite club with an integral shaft and head to be manufactured from one mold, eliminating the joint between the head and shaft. The integral head and shaft would allow the club to absorb more force without a corresponding weight penalty. Composite materials also dampen inherent vibration, reducing stress on the club itself and the hands, arms and shoulders of the golfer.

The rollerblade boot is another sporting good item which could be improved using the present invention. Currently many rollerblade boots are made from relatively heavy plastic. Composite boots would result in lighter, stiffer, faster and stronger rollerblades, reducing overall user fatigue. Few rollerblade boots are presently created from composite materials since many composite molding methods require the mandrel to become part of the finished product. The present invention would facilitate production of variously shaped composite rollerblade boots since the mandrel is dissolved after curing.

Larger structures, such as vehicle shells ranging from boat hulls and aircraft fuselages to automobile bodies, could also be manufactured using the present invention. A large mandrel would be wrapped with prepreg composite material, then heated and cured in a female mold. After removal from the mold, the mandrel is dissolved, resulting a strong, lightweight, hollow composite shell. Stringers and bulkheads could be incorporated into present invention hull molds instead of being produced separately and then bonded to the hull. The present invention would produce stronger joints between the hull and stringers without adding the bulk of extra bonding.

To fabricate an aircraft fuselage, a mandrel would be completely wrapped around prepreg to form a hollow shell of varying diameters from firewall to tail. The present invention could be used for sport aircraft where the entire fuselage would be fabricated in one mold, or for commercial aircraft where fuselage sections would be created from various molds and then bonded together. The present invention would also be appropriate for manufacturing other aircraft parts including wings, control surfaces, rotor blades, propeller blades, and antennae. On a smaller scale, the same process can be used for model aircraft component including fuselages, wings, frames and fuel cells.

Composite fuel cells are currently manufactured for several applications, including automobiles, aircraft, helicopters, ships, and other vehicles. The present invention would facilitate the production of complex fuel cells incorporating valve and fitting recesses or protrusions by increasing strength in corresponding joints without increasing the weight and need for various secondary operations required by prior art processes.

The foregoing disclosure of the preferred invention has been presented for the purpose of illustration and description. It is not intended to be exhaustive or to limit the invention to the precise form disclosed. Many variations and modifications of the embodiments described herein will be obvious to one of ordinary skill in the art in light of the above information. The scope of the invention is to be defined only by the claims appended hereto.

What is claimed is:

1. A method for manufacturing a hollow composite structure comprising:

(a) manufacturing a first half and a second half of a hollow semi-rigid inner mandrel from a thermoplastic material;

(b) placing an elastomeric tube inside the first half of the inner mandrel, and taping the second half of the inner mandrel over the elastomeric tube and the first half of the inner mandrel;

(c) wrapping the inner mandrel with layers of plies of a composite prepreg of thermosetting or thermoplastic resin having high strength reinforcement fibers therein, such that the layers of plies can be characterized as having an angle between successive layers, and such that said successive layers of said plies overlap with the angle between said successive layers of said plies have fiber orientations of at least three angles selected from the group consisting of $-60°, -45°, -30°, 30°, 30°, 45°, 60°$ and $90°$;

(d) placing the plies of said composite prepreg and the inner mandrel together in a mold for fabricating the hollow composite structure;

(e) inflating the elastomeric tube to a pressure in excess of 20 psi;

(f) heating the plies of said composite prepreg and the inner mandrel to an elevated temperature in excess of $200°$ F.;

(g) selecting a time period of at least fifteen minutes and curing the plies of said composite prepreg and the inner mandrel at the elevated temperature for the selected time period;

(h) allowing the plies of said composite prepreg and the inner mandrel to cool to a temperature below 150° F., at a maximum cooling rate of five to seven° F. per minute;

(i) removing the elastomeric tube; and (j) removing the mandrel by solvent extraction thereby providing said hollow composite structure.

2. The method of claim 1, further comprising placing the inner mandrel wrapped with said layers of plies of the composite prepreg in an autoclave prior to step (f), and pressurizing the autoclave to a pressure in excess of 25 psi.

3. The method of claim 2, wherein the pressure of the elastomeric tube is approximately equal to the pressure of the autoclave.

4. The method of claim 1, further comprising selecting a preheating period, wherein the layers of plies of said composite prepreg and the inner mandrel are preheated at a preheating temperature for the selected preheating period in excess of 125° F. prior to said step of heating the layers of plies of said composite prepreg and the inner mandrel to the elevated temperature.

5. The method of claim 1, further comprising manufacturing the first half and the second half of the hollow semi-rigid inner mandrel by:

(i) placing a sheet of thermoplastic material in a mold for fabricating the first half of the inner mandrel having cavities defining the shape of the first half of the hollow semi-rigid inner mandrel, said sheet having at least one edge, (ii) taping the at least one edge of the sheet in place, (iii) placing the mold for fabricating the first half of the hollow semi-rigid inner mandrel in an envelope vacuum bag, (iv) placing the envelope vacuum bag and the mold for fabricating the first half of the hollow semi-rigid inner mandrel in an oven, (v) heating the envelope vacuum bag and the mold for fabricating the first half of the hollow semi-rigid inner mandrel to an elevated temperature at which the thermoplastic material may be thermoformed, (vi) applying vacuum to the envelope vacuum bag and thus forcing the sheet of thermoplastic material into the cavities of the mold for fabricating the first half of the hollow semi-rigid inner mandrel and forming the first half of the hollow semi-rigid inner mandrel, (vii) allowing the first half of the hollow semi-rigid inner mandrel to cool, (viii) trimming the first half of the hollow semi-rigid inner mandrel, and (ix) carrying out steps (I)–(viii) for forming the second half of the hollow semi-rigid inner mandrel.

6. The method of claim 5, wherein the sheet of thermoplastic material is a polystyrene sheet.

7. The method of claim 5, wherein said solvent is methyl-ethyl-ketone.

8. The method of claim 5, wherein the envelope vacuum bag is a silicone vacuum bag.

9. The method of claim 1, wherein the elastomeric tube is made of one of silicone or ethylene-propylene terpolymer rubber.

10. The method of claim 1, wherein the elastomeric tube comprises a breather strip.

11. The method of claim 1, wherein the plies of said composite prepreg comprise graphite fibers and an epoxy resin.

12. The method of claim 1, wherein the plies of said composite prepreg comprise at least one of fiberglass, aramid and boron reinforcing fibers.

13. A method form fabricating hollow tubular structures comprising:

(a) fabricating two patterns;

(b) placing a separate sheet of thermoformable material over a corresponding one of said two patterns, each said separate sheet having at least one edge;

(c) taping each said separate sheet of thermoformable material at the at least one edge to the corresponding one of said two patterns and then placing each of said two patterns in separate vacuum bags;

(d) placing the vacuum bags in an oven;

(e) heating the oven to an elevated temperature until each said separate sheet of thermoformable material is forced into the corresponding one of said two patterns, such that each said separate sheet now forms one half of a mandrel;

(f) selecting a time period and holding each said one half of the mandrel under vacuum at the elevated temperature for the selected time period;

(g) allowing each said one-half of the mandrel to cool below 200° F. and removing the two patterns from the oven;

(h) removing each said one half of the mandrel from the two patterns to provide a first half and a second half of the mandrel;

(i) trimming all of the thermoformable material that is in excess of the first half and the second half of the mandrel;

(j) placing an elastomeric bladder having a breather strip in the first half of the mandrel;

(k) placing the second half of the mandrel over the elastomeric bladder, and taping the first half and the second half of the mandrel together, thus forming a tubular mandrel, said tubular mandrel containing the elastomeric bladder;

(l) preparing tapes of a prepreg material comprising a resin and reinforcing fibers;

(m) wrapping the tapes of said prepreg material over the tubular mandrel using at least two relative orientations selected from the group of relative orientations consisting of 0°, $^+45°$, $^+60°$, and 90°;

(n) placing the wrapped tubular mandrel in a curing mold;

(o) placing the curing mold in an oven;

(p) selecting a pressure between 20 psi and 200 psi, and inflating the elastomeric bladder to the selected pressure;

(q) selecting a temperature between 200° F. and 600° F., and raising the temperature of the oven to the selected temperature;

(r) curing the prepreg material to form a hollow tubular structure;

(s) removing the hollow tubular structure from the oven; and (t) removing the tubular mandrel from the hollow tubular structure by solvent extraction.

14. The method of claim 13, further comprising selecting a first preselected oven temperature, wherein the oven is an autoclave oven, and wherein the autoclave oven is pressurized to a pressure of at least 100 psi when the temperature of the autoclave oven is at the first preselected oven temperature.

15. The method of claim 14, further comprising selecting a second preselected oven temperature and a preselected oven pressure, and heating the autoclave oven to the second preselected oven temperature and pressurizing the autoclave oven to the preselected oven pressure, prior to step (q).

16. The method of claim 15, wherein the second preselected temperature is 125° F. to 150° F.

17. The method of claim 15, further comprising reducing the second preselected temperature of the autoclave oven to below 100° F. at a rate of 1.5° to 2° F. per minute.

18. The method of claim 14, wherein the selected pressure of the elastomeric bladder is approximately 100 psi.

19. The method of claim 13, wherein the selected temperature is approximately 250° F.

20. The method of claim 19, wherein the prepreg material comprises at least one of graphite fibers, aramid fibers, fiberglass fibers and boron fibers.

21. The method of claim 13, wherein the thermoformable material is selected from the group consisting of polystyrene and acrylonitride-butadiene-styrene co-polymer.

\* \* \* \* \*